UNITED STATES PATENT OFFICE.

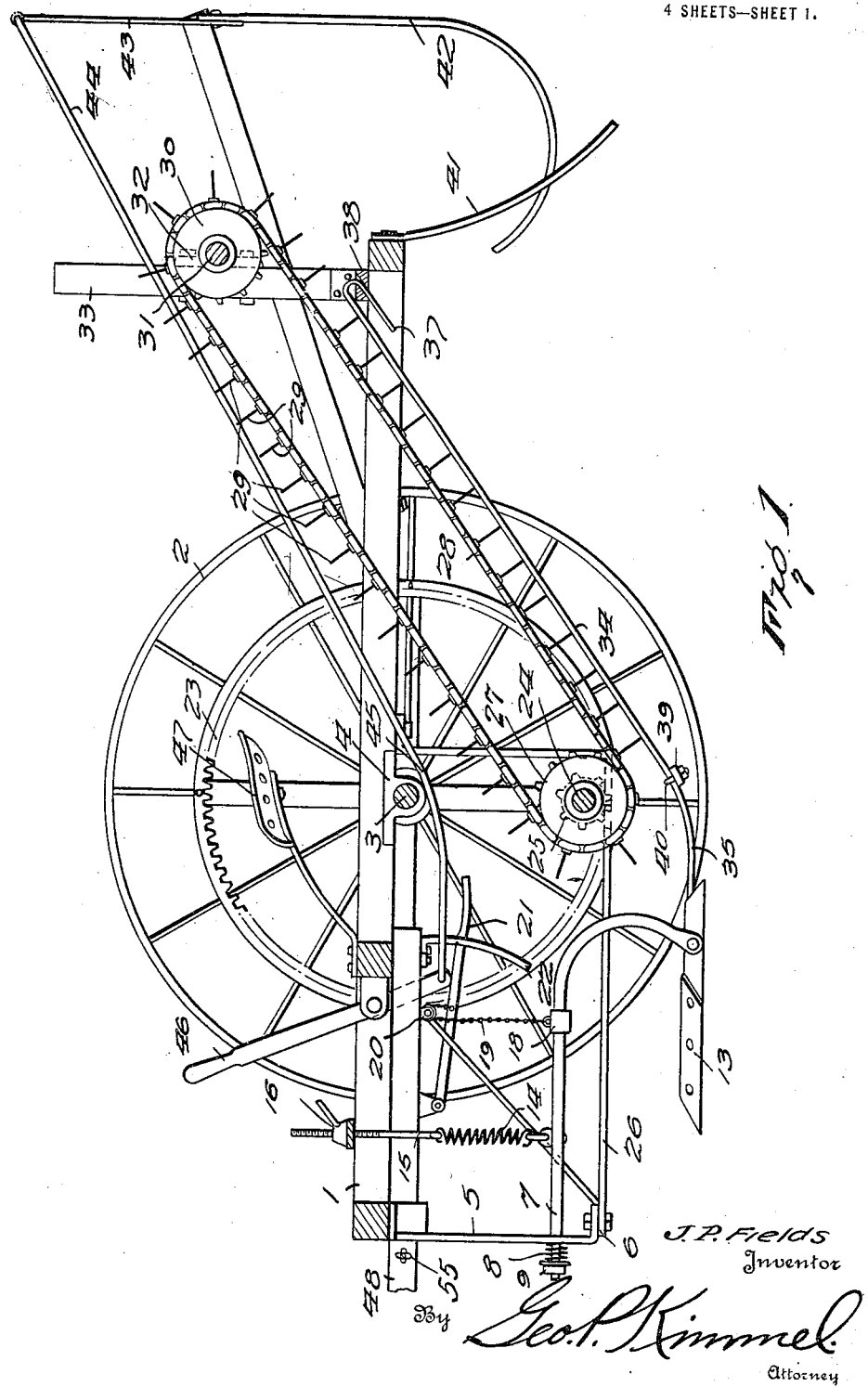

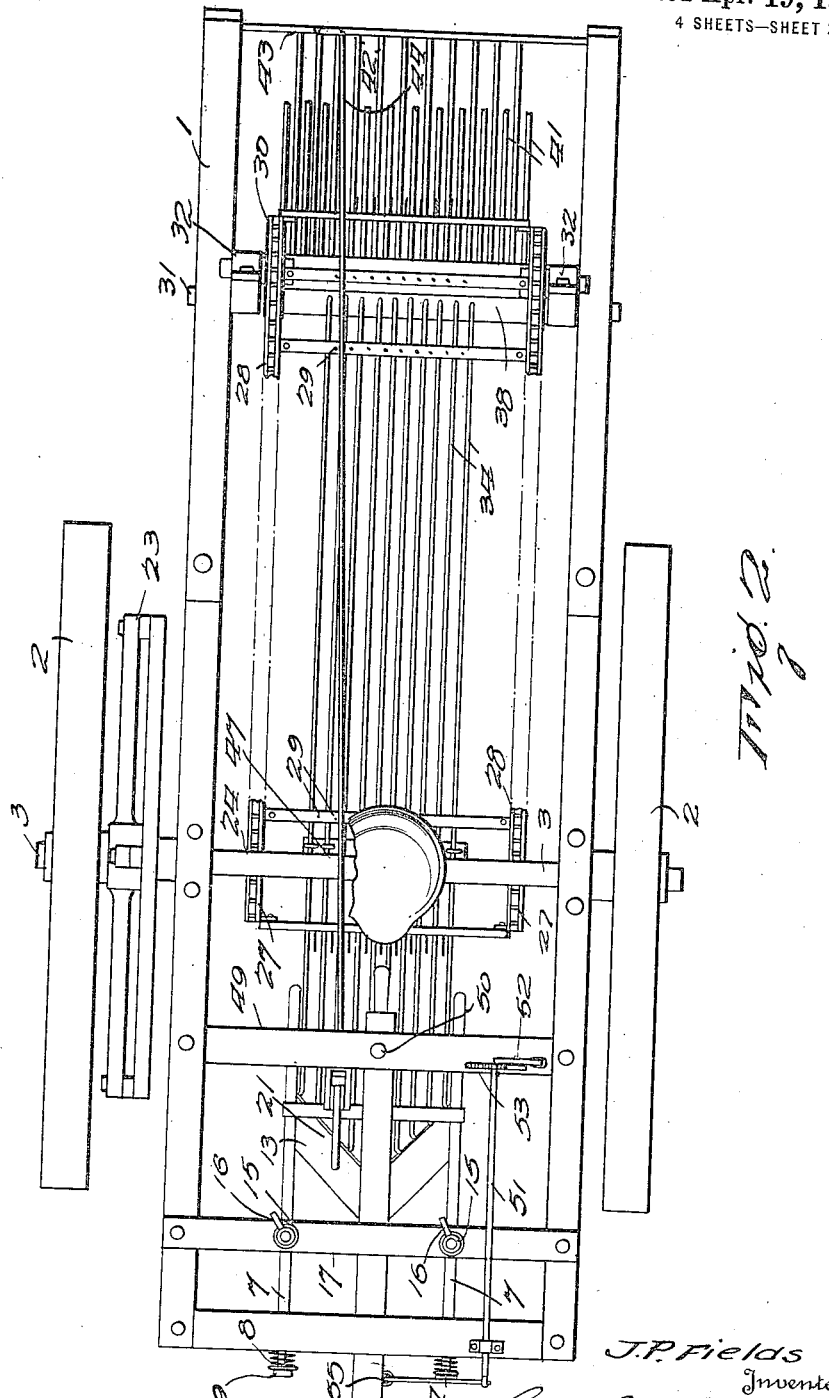

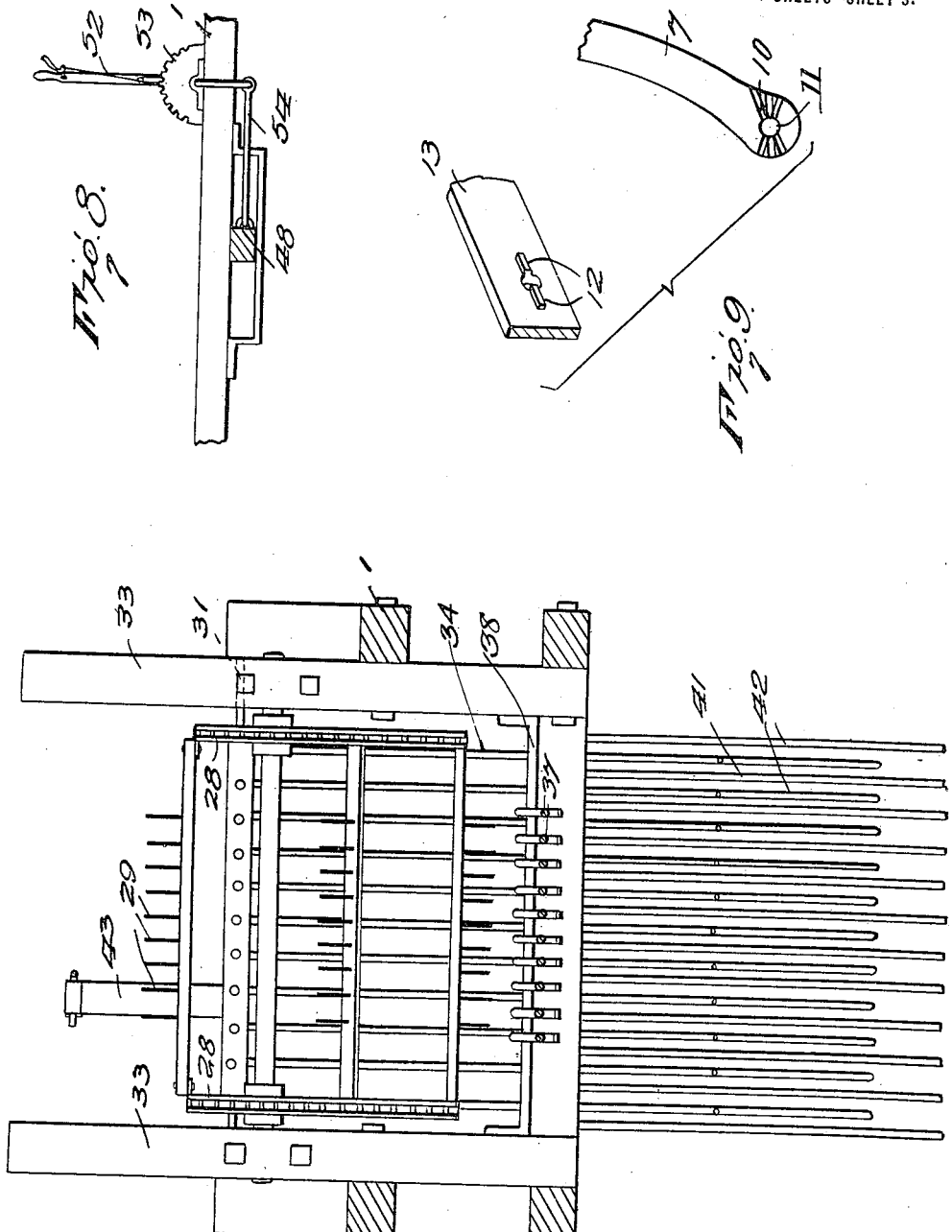

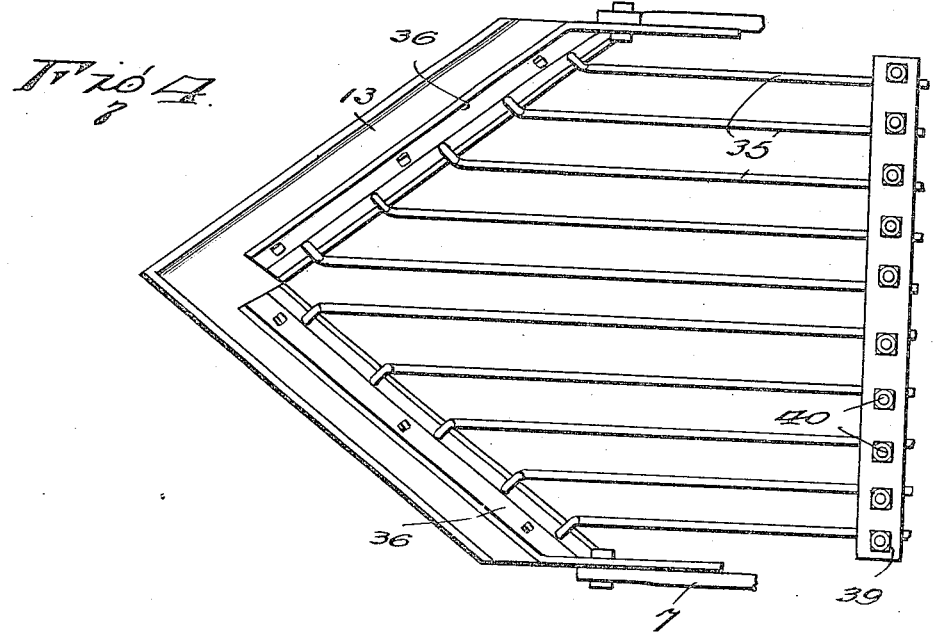
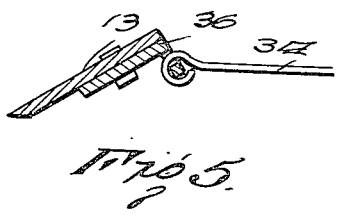
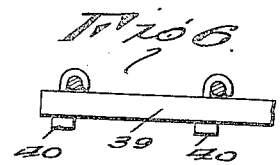
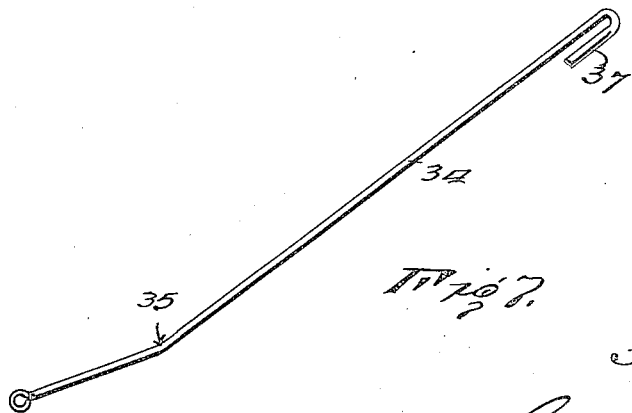

JOSEPH PASCHAL FIELDS, OF ATTAPULGUS, GEORGIA.

PEANUT-HARVESTING MACHINE.

1,375,578.  Specification of Letters Patent.  Patented Apr. 19, 1921.

Application filed July 18, 1918. Serial No. 245,506.

*To all whom it may concern:*

Be it known that I, JOSEPH P. FIELDS, a citizen of the United States, and resident of Attapulgus, in the county of Decatur and State of Georgia, have invented certain new and useful Improvements in Peanut-Harvesting Machines, of which the following is a specification.

This invention relates to improvements in harvesting machines and it is the principal object of the invention to provide a machine for harvesting peanuts in a rapid and effectual manner and to cause the removal of the greater portion of soil therefrom during their movement to the receiving and dumping means.

Another and equally important object of the invention is to provide a harvesting machine having a novel form of earth working means, said means being so supported as to permit adjusting of the same in the event that any form of obstruction is engaged and which can be adjusted to permit engagement with the soil at the desired depths.

Another important characteristic of the invention resides in the provision of an improved form of conveying means capable of engaging the peanuts subsequent to removal from the soil and moving the same upwardly over a grating-like structure into a receiving and dumping means, movement of the peanuts over said grating-like structure serving to remove the greater portion of the soil adhering thereto.

Other and further improvements and novel details in the construction and arrangement of parts will be appreciated from the description to follow, which for a clear understanding of the invention should be considered in connection with the accompanying drawings forming a part hereof and wherein a preferred embodiment of the invention is shown for the purpose of illustration.

In the drawings:

Figure 1 is a vertical longitudinal section through the improved machine,

Fig. 2 is a top plan view thereof,

Fig. 3 is a vertical transverse section through the machine,

Fig. 4 is a detail in bottom plan of the earth working element showing the connection of the grating rods thereto, Fig. 5 is a fragmentary detail in section showing the specific form of connection of the grating rods to the earth working element, Fig. 6 is a fragmentary detail partly in section showing the manner in which the grating rods are maintained in equidistant relation, Fig. 7 is a detail in perspective of one of the grating rods, Fig. 8 is a fragmentary detail partly in section of the draft pole regulating means, and Fig. 9 is a fragmentary disassembled detail in perspective showing the connection of the earth working element to the beam.

Referring now more specifically to the drawings, in connection with which like reference characters will designate corresponding parts throughout the several views, 1 represents the substantially rectangular frame of the machine, the same being provided with wheels 2 mounted on the opposite ends of a live axle 3 supported in bearings 4 on the opposite sides of said frame, at points intermediate its ends.

Secured to the under side of the forward end of the machine frame 1 and depending therefrom are a plurality of arms 5, the lower ends of which are bent at substantially right angles and engaged by a transversely disposed connecting bar 6, bolts or similar fastening devices, of course being passed through said right angularly disposed ends and said bar. Beams 7 are provided and have their forward ends reduced and loosely engaged in openings formed in the intermediate arms 5 and are held against displacement with relation thereto by means of coil springs 8 arranged about the reduced ends thereof and having bearing on lock nuts 9 turned into engagement with said reduced ends of the beams. The remaining ends of the beams have certain of the sides thereof formed with radially disposed serrations 10, said serrations extending from an opening 11 formed in the ends of each of said beams, whereby to permit reception of key members 12 therein, said key members being carried on the adjacent sides of a substantially V-shaped earth working element 13. In this way, it will be readily understood that the positioning of the earth working element 13 with relation to the beams 7 can be varied to regulate its engagement with the soil. Coil springs 14 are engaged at their lower ends with each of the beams 7, preferably at points in proximity to the forward or reduced ends thereof by eyes or similar connecting means and have their upper ends connected to screw threaded adjusting rods 15 having nuts 16 turned into engagement therewith and bearing on a cross bar 17 arranged transversely of the frame 1. In this way, the beams 7 together with the earth working elements 13 will be properly positioned with relation to the harvesting machine frame. However, to permit of vertical adjustment of the cultivating elements 13, a collar 18 is engaged with each of the beams and has certain of the ends of chains 19 connected thereto, said chains passing upwardly over pulleys 20 secured to the machine frame into engagement with foot levers 21 mounted on the underside of the frame in suitable bearings and arranged at points convenient to the operator's seat, each of said levers being provided with toothed segmental guides 22 whereby the same can be locked in adjusted positions to maintain the earth working element connected thereto in the desired position.

Mounted on the live axle 3 at a point adjacent one of the wheels 2 is an internal gear 23 having connection with a driven shaft 24 by means of a pinion 25, it being noted that the driven shaft 24 is supported in suitable bearings arranged on sub-frame members 26, certain of the ends of which are bent at right angles and secured to the under sides of the machine frame 1 while the remaining ends are engaged with the bar 6. The driven shaft 24 is extended transversely of the machine frame and carries sprocket wheels 27 thereon receiving sprocket chains 28 thereabout, said sprocket chains, of course being arranged in spaced relation and carrying transversely disposed bars thereon on which fingers 29 are arranged, for a purpose which will be presently apparent. The sprocket chains 28 are inclined and are engaged at their upper ends over sprocket wheels 30 mounted on a transversely disposed shaft 31 journaled in bearings 32 arranged on standards 33 secured to the machine frame, thus, affording an effectual form of inclined conveying means.

A grating-like structure is provided for by means of a plurality of longitudinally disposed rods 34, the lower ends of which are curved as at 35 and loosely connected to angle pieces 36 secured to the under sides of the earth working element 13, while the remaining or opposite ends thereof are hooked as at 37 and slidably engaged with a transversely disposed bar 38 having a plurality of diagonally disposed openings formed therein for receiving the hooked ends 37 therethrough. To maintain the rods 34 in equidistant relation to insure proper functioning of the same, a connecting bar 39 may be and preferably is arranged transversely of the lower portions thereof and is apertured to permit the passing of eyebolts 40 therethrough, said bolts receiving portions of the rods 34 therethrough and having nuts turned into engagement with their outer ends and bearing on said bar 39. In this connection, it may be noted that by so engaging the hooked ends 37 of the rods 34 with the bar 38, sliding movement of the same with relation to said bar is permitted and as a consequence, distortion thereof upon movement of the earth working element 13, such as may be caused by its engagement with an obstruction of some sort is prevented. Further, it is to be noted that the grating-like structure afforded by the rods 34 is so arranged with relation to the sprocket chains 28 as to be engaged by the fingers 29 carried thereon, and consequently, permitting the peanut plants harvested by the machine to be conveyed upwardly thereover.

Secured to the rear end of the machine frame 1 and depending therefrom are a plurality of curved fingers 41, which fingers in turn receive the curved lower ends of other fingers 42 therebetween, these fingers 42 being connected with a transversely disposed rod engaged therewith at their upper ends and having an arm 43 extending therefrom, which arm is pivoted to one end of an operating rod 44, the lower end of which is curved as at 45 to permit its passage under the axle 3 into engagement with a hand lever 46 mounted on the machine frame at a point convenient to the operator's seat 47. Hence, by rocking the hand lever 46 the fingers 42 can be caused to be swung outwardly from the fingers 41, thus permitting the peanut plants arranged therein to be dumped therefrom as it becomes necessary.

To permit the drawing of the machine over a field or other surface, a draft pole 48 is provided and is pivoted to a crossbar 49 thereon as at 50 at a point adjacent its rear end. Adjustment of this draft pole 48 is permitted by means of a crank shaft 51 mounted in bearings on the machine frame and extending longitudinally thereof to a point convenient to the operator's seat whereat it is provided with a handle 52 carrying the usual form of pawl engageable with a toothed segment 53. The remaining end of the crank shaft 51 is pivoted to a link 54 extended into engagement with a portion of the draft pole as at 55. By rocking the crank shaft 51 through the medium of the handle 52, it is obvious that lateral movement of the draft pole 48 will be effected due to its connection therewith and consequently, the turning of the machine in the desired direction can be facilitated.

In operation, the machine is drawn or moved over a field having the peanuts planted therein whereupon the earth working element 13 is properly adjusted with relation to the beams 7 and with relation to the frame 1 of the machine, the nuts 16 having been previously adjusted to place the springs 14 under proper tension. With the earth working element engaged in the soil, the peanut plants will be removed therefrom and will move upwardly thereover onto the curved lower ends 35 of the grating-like structure afforded by the longitudinally disposed rods 34. Motion is transmitted to the sprocket chains 28 forming the conveying means by way of the internal gears 23, the driven shaft 24 and the pinion 25, thus causing the fingers 29 carried by the sprocket chains to be moved upwardly over the inclined grating structure and in this way engage the peanut plants and move the same upwardly thereover and finally discharge the same into the receiving receptacle afforded by the arrangement of the curved fingers 41 and 42. During such movement of the peanut plants over the grating-like structure, it will be readily understood that the greater portion of the soil adhering thereto will be removed and consequently further handling thereof will be facilitated. When the receiving receptacle afforded by the curved fingers 41 and 42 is filled and it is desired to dump the same, the hand lever 46 is rocked, thereby causing said fingers 42 to be swung outwardly from the fingers 41. Should for any reason, the earth working element 13 meet with resistance during its movement through the soil, it will be of course permitted to automatically adjust itself and pass the obstruction or whatever the form offering the resistance may be, due to its connection with the arms 5 through the medium of the beams 7. Further, distortion of the rods 34 forming the grating-like structure is prevented by reason of the engagement of the hooked ends 37 thereof with the transversely disposed rod 38.

Manifestly, the construction shown is capable of considerable modification and such modification as is within the scope of my claims, I consider within the spirit of my invention.

I claim:

1. In a peanut harvesting machine, a supporting frame, beams adjustably supported from said frame, an earth working element adjustably connected to said beams, a plurality of rods connected at their forward ends to said earth working means and extending rearwardly, means for slidably coupling said rods at their rear ends to said frame, and conveyer means operating over said rods.

2. In a peanut harvesting machine, a wheeled frame, secondary frames secured to the underside of the forward portion of said first frame, beams loosely connected at their forward ends to said secondary frames, an earth working element adjustably connected to the free ends of said beams, adjustable means for supporting the beams with relation to the frame, other means for effecting vertical adjustment of the beams with relation to the frame, and conveying means extending longitudinally of the frame and communicating with said earth working means.

3. In a peanut harvesting machine, a wheeled frame, depending arms secured to the forward end of the frame, beams loosely engaged at their forward ends with the lower portions of said arms, a substantially V-shaped earth working element adjustably connected between the remaining ends of said beams, and inclined conveying means extending longitudinally of the frame and communicating with said earth working means.

4. In a peanut harvesting machine, a wheeled frame, depending arms secured to the forward end of the frame, beams loosely engaged at their forward ends with said arms, an earth working element adjustably connected to the remaining ends of said beams, a plurality of inclined longitudinally disposed rods loosely connected at their lower ends to said earth working element and slidably connected at their ends to a portion of the frame, and inclined conveying means disposed longitudinally of the frame and movable over said rods.

5. In a peanut harvesting machine, a wheeled frame, secondary frames secured to the underside of the forward portion of the frame, beams loosely engaged at their forward ends with the forward ends of said secondary frames, a substantially V-shaped earth working element adjustably secured between the remaining ends of said beams, means for adjustably supporting said beams with relation to the frame, other means engaged with the beams for adjusting the same vertically with relation to the frame, a plurality of inclined rods extended longitudinally of the frame having their lower ends curved and loosely connected to said V-shaped earth working element and their remaining ends hooked and slidably engaged with portions of said frame, conveying means arranged longitudinally of the frame and movable over said rods, a plurality of curved fingers secured to and depending from the rear of said frame, other fingers having their lower portions curved and pivoted to said frame and adapted to coöperate with said first fingers to produce a receiving receptacle for receiving stuff from the conveying means, and means connected to said second fingers for moving the same outwardly from said first fingers.

JOSEPH PASCHAL FIELDS.